(12) United States Patent
Komatsu et al.

(10) Patent No.: US 7,136,232 B2
(45) Date of Patent: Nov. 14, 2006

(54) MINIATURE ZOOM LENS

(75) Inventors: Akira Komatsu, Nagano (JP); Akihiro Shimizu, Nagano (JP); Katsuyuki Honda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/906,385

(22) Filed: Feb. 17, 2005

(65) Prior Publication Data

US 2005/0185286 A1 Aug. 25, 2005

(30) Foreign Application Priority Data

Feb. 19, 2004 (JP) ............................. 2004-043029

(51) Int. Cl.
  *G02B 15/14* (2006.01)
  *G02B 15/16* (2006.01)
(52) U.S. Cl. ..................................... 359/689; 359/680
(58) Field of Classification Search ................ 359/689, 359/686, 676
  See application file for complete search history.

(56) References Cited

U.S. PATENT DOCUMENTS 6,480,340 B1 * 11/2002 Yamamoto .................. 359/676

FOREIGN PATENT DOCUMENTS

| JP | 05-107469 A | 4/1993 |
|---|---|---|
| JP | 05-323190 A | 12/1993 |
| JP | 09-96759 A | 4/1997 |
| JP | 11-237549 A | 8/1999 |
| JP | 11-305117 A | 11/1999 |
| JP | 2001-021799 A | 1/2001 |
| JP | 2001-042211 A | 2/2001 |
| JP | 2002-031754 A | 1/2002 |
| JP | 2002-055278 A | 2/2002 |
| JP | 3285538 B2 | 3/2002 |
| JP | 2003-177315 A | 6/2003 |

OTHER PUBLICATIONS

Patent Abstracts of Japan, vol. 2002, No. 07, Jul. 3, 2002 & JP 2002 072095 A (Minolta Co. Ltd.), Mar. 12, 2002.
Patent Abstracts of Japan, vol. 2003, No. 12, Dec. 5, 2003 & JP 2004 070235 A (Minolta Co. Ltd.) Mar. 4, 2004.

* cited by examiner

*Primary Examiner*—Scott J. Sugarman
*Assistant Examiner*—Darryl J. Collins
(74) *Attorney, Agent, or Firm*—Sughrue Mion, PLLC

(57) ABSTRACT

A miniature zoom lens has, sequentially from an object side, a first lens group G1 having negative refractive power, a second lens group G2 having positive refractive power and including a diaphragm, and a third lens group G3 having positive refractive power. The first lens group G1 is formed from a single negative lens L1. The second lens group G2 is formed from, sequentially from the object side, a single positive lens L2 and a single negative lens L3. The third lens group G3 is formed form a single positive lens L4. The first lens group G1 is immovable and the second lens group G2 and the third lens group G3 move in an optical axis direction at variable power. The miniature zoom lens provides a large zoom ratio while keeping a constant total length.

5 Claims, 5 Drawing Sheets

F I G. 2
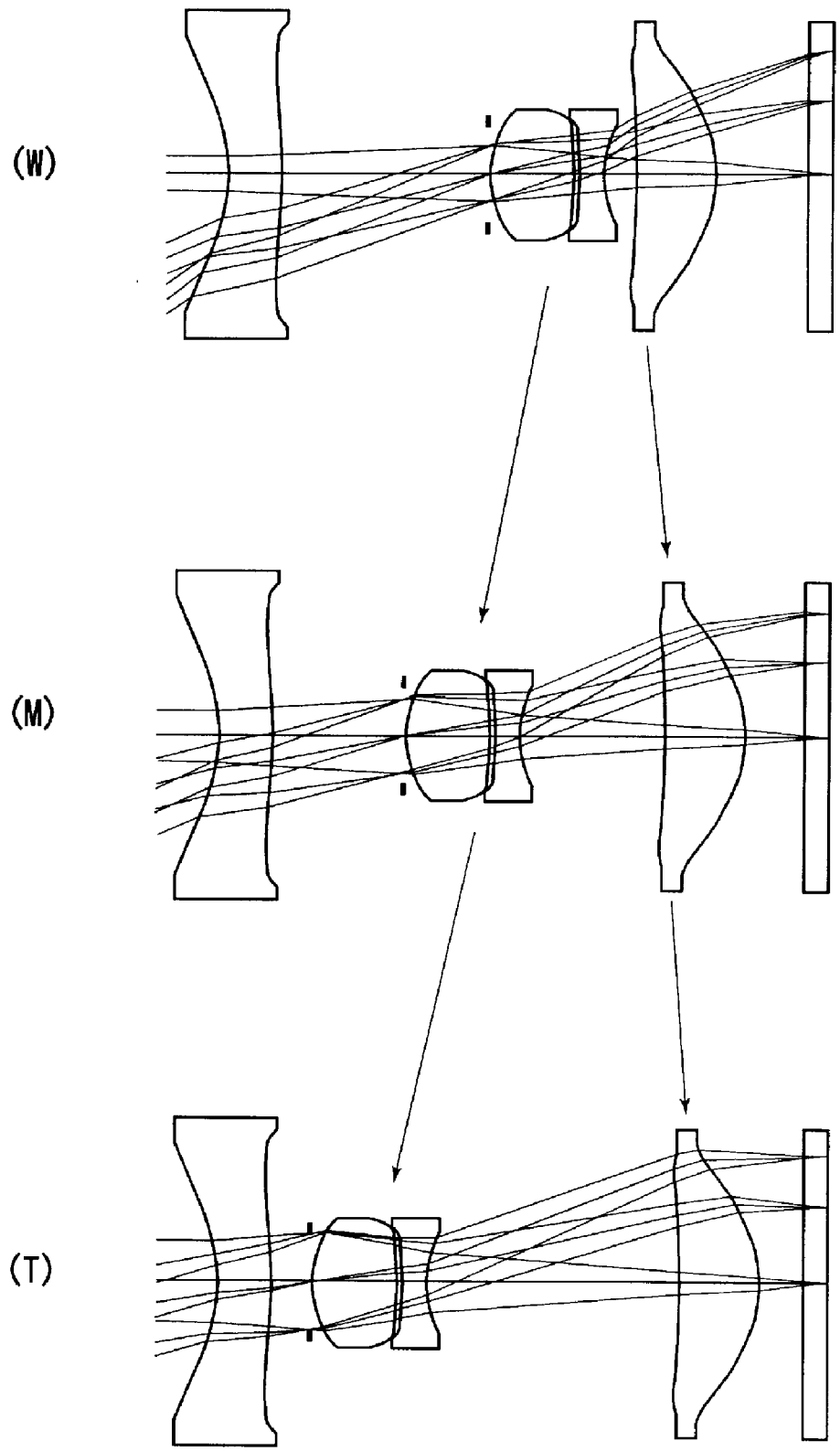

Fig. 4

[Table 1]

| Surface No. | Radius of Curvature, R | Interval D | Nd | Vd | |
|---|---|---|---|---|---|
| 1 | -2.7649 | 1.09 | 1.48749 | 70.2 | L1 |
| 2 | -8.4586 | 4.19 | | | |
| 3 | ∞ | 0.05 | | | Diaphragm |
| 4 | 1.84 | 1.72 | 1.61800 | 63.4 | L2 |
| 5 | -8.4603 | 0.10 | | | |
| 6 | 14.5191 | 0.50 | 1.68893 | 31.1 | L3 |
| 7 | 1.6791 | 0.67 | | | |
| 8 | -46.1432 | 1.63 | 1.48749 | 70.2 | L4 |
| 9 | -2.5712 | 1.85 | | | |
| 10 | ∞ | 0.50 | 1.51633 | 64.1 | L5 |
| 11 | ∞ | 0.40 | | | Cover Glass |

Fig. 5

[Table 2]

| Surface No. | K | $A_4$ | $A_6$ | $A_8$ | $A_{10}$ |
|---|---|---|---|---|---|
| 1 | -3.19654 | 3.3727E-03 | -1.0096E-04 | -3.7314E-05 | 3.4460E-06 |
| 2 | 5.1399 | 1.0930E-02 | -3.4626E-04 | -1.1579E-04 | 1.5634E-05 |
| 4 | -0.35593 | 2.6728E-03 | 3.8474E-03 | -1.1123E-03 | 8.9743E-05 |
| 5 | -315.99 | -5.8627E-03 | -1.3634E-02 | -3.0314E-02 | 2.1572E-03 |
| 6 | 0 | -3.9851E-02 | -8.5437E-02 | 1.0979E-02 | -1.9775E-02 |
| 7 | -0.87963 | -4.0297E-02 | -6.8017E-03 | 7.9317E-03 | 1.5331E-03 |
| 8 | 0 | -4.9165E-03 | -4.6737E-04 | 2.4470E-04 | -9.3314E-06 |
| 9 | -0.50137 | 6.4516E-03 | -6.7107E-04 | 2.2286E-06 | 1.7495E-05 |

Fig. 6

[Table 3]

| Design Specification | Mark | Example | | |
|---|---|---|---|---|
| | | Wide Angle (w) | Standard (M) | Telephoto (T) |
| Angle of View | $2\omega$ | 74.6° | 50.4° | 34.2° |
| Focal Length | F | 3.44 | 5.17 | 8.17 |
| F Number | Fno | 3.0 | 4.2 | 5.5 |
| Lens Back | Fb | 0.40 | 0.40 | 0.40 |
| Max. Image Height | H | 2.5 | ← | ← |
| Exit Pupil Length | EP | −7.9 | −56.3 | 21.9 |
| Interval between G1 and G2 | T1 | 4.24 | 2.71 | 0.79 |
| Interval between G2 and G3 | T2 | 0.67 | 2.86 | 5.08 |
| Focal Length of G1 | F1 | −8.96 | ← | ← |
| Focal Length of G2 | F2 | 4.67 | ← | ← |
| $|F_1|/F_w$ | | 2.60 | ← | ← |
| $F_2/F_w$ | | 1.36 | ← | ← |

MINIATURE ZOOM LENS

This application claims foreign priority from Japanese Patent Application 2004-043029, filed on Feb. 19, 2004, which is incorporated by reference, herein, in its entirety.

FIELD OF THE INVENTION

The present invention relates to a miniature zoom lens for use in a digital camera or the like using a miniature solid-state image sensor and incorporated into a mobile phone or the like.

The miniature zoom lens of the invention can be used for an optical system in a digital camera and a digital video camera incorporated, for example, into a mobile phone, a personal digital assistant, etc.

BACKGROUND OF THE INVENTION

Recently, compact digital camera and digital video camera using a solid-state image sensor, such as a CCD and a CMOS, have been integrated into a mobile phone or a personal digital assistant. A surveillance camera having a built-in digital video camera has been getting smaller in size. These cameras need a miniature optical system suitable for a miniature solid-state image sensor, and it is convenient when the miniature optical system is, preferably, a zoom lens of a structure such that can vary a focal length of the overall lens system continuously while keeping the image-forming position on the same plane.

As a miniature zoom lens of a simple configuration using fewer lenses, a three-component zoom lens has been known, which comprises, sequentially from the object side, a first lens group having negative refractive power, a second lens group having positive refractive power, and a third lens group having positive refractive power as has been disclosed, for example, in the following documents, referred to hereafter as Patent Documents 1 through 4:

Patent Document 1 (JP-A-5-323190);

Patent Document 2 (JP-A-11-237549);

Patent Document 3 (JP-A-2002-55278); and

Patent Document 4 (JP-A-2003-177315).

Each of the three-component zoom lenses in the related art, however, has problems. For example, the zoom lens disclosed in Patent Document 1 is of a simple configuration by forming each lens group from a single lens; however, it fails to attain a zoom ratio of two times and the performance as a zoom lens is therefore insufficient. The zoom lens disclosed in Patent Document 2 is for use in an electron still camera, and an interval between the first lens group and the second lens group is 13 mm or longer. Hence, this zoom lens is not small enough to be incorporated into a mobile phone or the like. The zoom lens disclosed in Patent Document 3 is of a relatively miniature size by forming each lens group from a single lens and attains a large zoom ratio; however, in order to attain a large zoom ratio, the first lens group and the second group have to move, which causes a total length to vary. This raises a problem that it is difficult to incorporate this zoom lens into a portable device. The zoom lens disclosed in Patent Document 4 is of a relatively miniature size by forming each of the first lens group and the third lens group from a single lens and the second lens group from two positive and negative lenses, and attains a large zoom ratio; however, because the first lens and the second lens have to move, this zoom lens also has a problem that a total length varies.

SUMMARY OF THE INVENTION

The invention was devised in view of the foregoing, and therefore has an object to provide a high-performance miniature zoom lens of a simple configuration, capable of attaining a large zoom ratio while keeping a constant total length.

In order to achieve the above and other objects, a first aspect of the invention provides a miniature zoom lens, characterized by having, sequentially from an object side, a first lens group having negative refractive power, a second lens group having positive refractive power and including a diaphragm, and a third lens group having positive refractive power, wherein: the first lens group is formed from a single negative lens, the second lens group is formed from, sequentially from the object side, a single positive lens and a single negative lens, and the third lens group is formed from a single positive lens; and the first lens group is immovable and the second lens group and the third lens group move in an optical axis direction at variable power.

The three-component zoom lens is of a simple configuration using four lenses in three groups, in which each of the first lens group and the third lens group is formed from a single lens, and the second lens group is formed from two lenses. Also, because the first lens group is immovable whereas the second lens group and the third lens group move, the total length will not vary. Further, by forming the first lens group from a single negative lens, the second lens group from two positive and negative lenses, and the third lens group from a single positive lens, it is possible to increase a zoom ratio while correcting aberration satisfactorily.

A second aspect of the invention provides a miniature zoom lens according to the first aspect, wherein: the negative lens forming the first lens group is a meniscus lens having at least one aspherical surface and whose surface having a larger curvature faces the object side; the positive lens forming the second lens group includes at least one aspherical surface, and the negative lens forming the second lens group includes at least one aspherical surface; and the positive lens forming the third lens group is configured so that a surface having a larger curvature faces an image-forming surface side.

According to the configuration as above, even when a zoom ratio is increased, it is still possible to correct aberrations of various kinds satisfactorily.

A third aspect of the invention provides a miniature zoom lens according to the first or second aspect, wherein: Conditional Expression (1) specified below is satisfied:

$$2.5 < |F_1|/F_W < 3.0 \tag{1}$$

where $F_1$ is a focal length (mm) of the first lens group, and $F_W$ is a focal length (mm) of an overall lens system at a wide angle end.

By satisfying Conditional Expression (1) above, it is possible not only to reduce the zoom lens in size and to adequately set the refractive power of the first lens group, but also to satisfactorily correct aberrations of various kinds.

A fourth aspect of the invention provides a miniature zoom lens according to any of the first through third aspects, wherein: Conditional Expression (2) specified below is satisfied:

$$1.0 < |F_2|/F_W < 1.5 \tag{2}$$

where $F_2$ is a focal length (mm) of the second lens group, and $F_W$ is a focal length (mm) of an overall lens system at a wide angle end.

By satisfying Conditional Expression (2) above, it is possible not only to reduce the zoom lens in size and to adequately set the refractive power of the second lens group, but also to satisfactorily correct aberrations of various kinds.

A fifth aspect of the invention provides a miniature zoom lens according to any of the first through fourth aspects, wherein: the positive lens forming the second lens group is a biconvex lens; the negative lens forming the second lens group is a negative meniscus lens; and the positive lens forming the third lens group is a positive meniscus lens.

According to the configuration as above, even when a zoom ratio is increased, it is still possible to correct aberrations of various kinds satisfactorily.

The invention is taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings:

FIG. 2 is a cross section showing the locations of lens groups at variable power in the example of the miniature zoom lens of the invention.

FIG. 4 shows a data table relating to an exemplary embodiment of the invention, namely, Table 1.

FIG. 5 shows another data table relating to an exemplary embodiment of the invention, namely, Table 2.

FIG. 6 shows yet another data table relating to an exemplary embodiment of the invention, namely, Table 3.

DETAILED DESCRIPTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

An embodiment of a miniature zoom lens of the invention will be described below. It should be appreciated, however, that the invention is not limited to the embodiment below.

Figure 1:
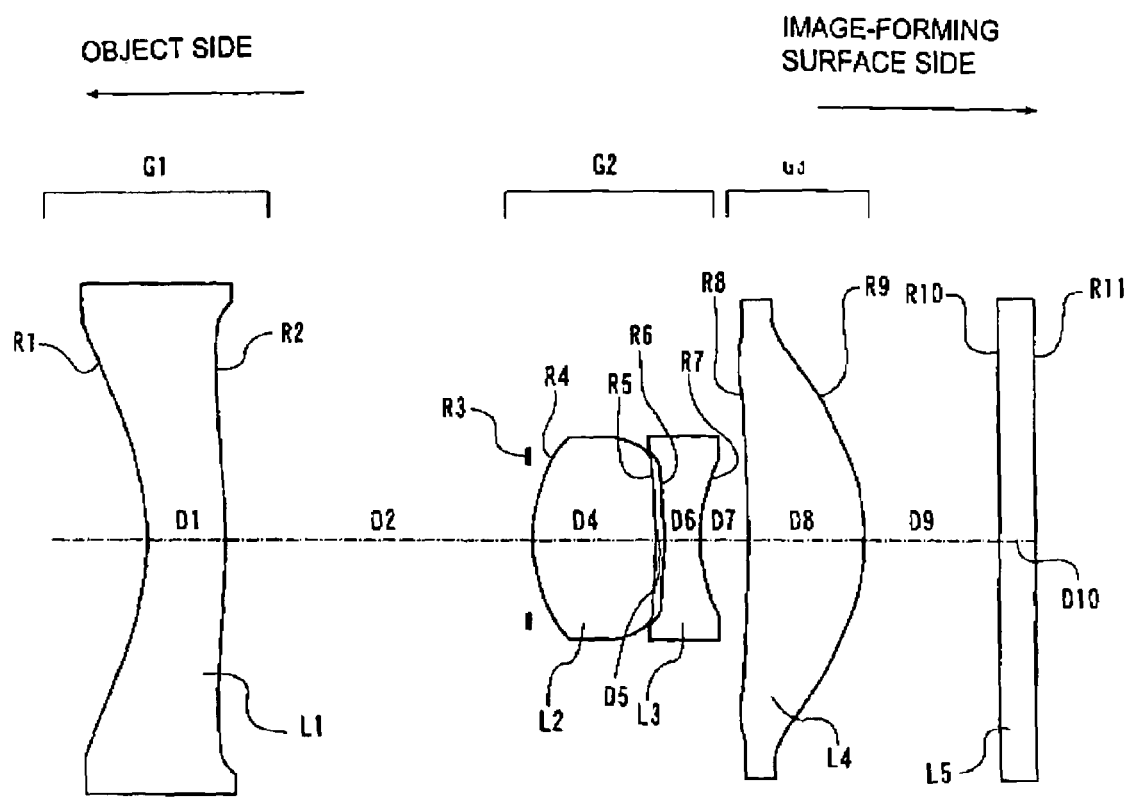
FIG. 1 shows cross sections of lenses in an example of a miniature zoom lens of the invention.
Figure 3:
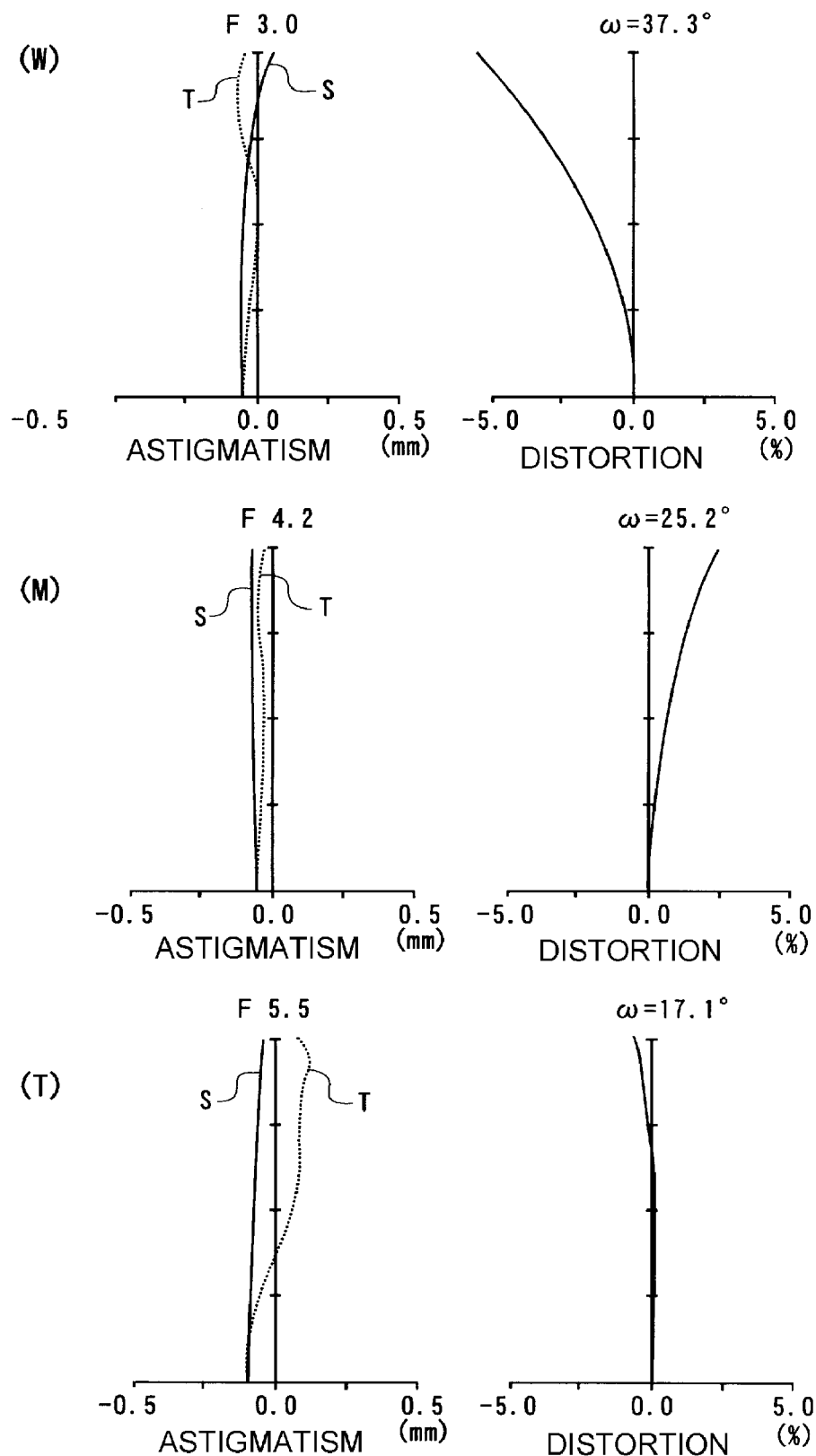
FIG. 3 shows astigmatism charts and distortion charts in the example.

FIG. 1 shows cross sections of lenses in an example of a miniature zoom lens of the invention. FIG. 2 shows locations of lens groups at variable power. FIG. 3 shows astigmatism charts and distortion charts in this example.

In the cross sections of respective lenses, a reference Ri (i is an integer from 1) indicates a serial lens surface number from the object side to the image-forming surface side, a reference Di (i is an integer from 1) indicates, sequentially from the object side to the image-forming surface side, a center thickness of a lens and an air interval (mm) between lenses along the axis of a principle ray. G1 indicates a first lens group, G2 indicates a second lens group, and G3 indicates a third lens group. The astigmatism charts show aberration with respect to a sagittal (S) image surface and a tangential (T) image surface. The symbol ω in the distortion charts indicates a half angle of view.

The miniature zoom lens according to the foregoing embodiment of the invention is a zoom lens using four lenses in three groups and comprising, sequentially from the object side, a first lens group G1 having negative refractive power, a second lens group G2 having positive refractive power and including a diaphragm, and a third lens group G3 having positive refractive power. The first lens group G1 comprises a single first lens L1 having negative refractive power. The second lens group G2 comprises, sequentially from the object side, a single second lens L2 having positive refractive power and a single third lens L3 having negative refractive power. The third lens group G3 comprises a single fourth lens L4 having positive refractive power.

As is shown in FIG. 2, the miniature zoom lens of the invention is configured in such a manner that: the first lens group G1 is immovable; the second lens group G2 moves markedly toward the first lens group G1 in the optical axis direction to reduce an interval between the first lens group G1 and the second lens group G2 at variable power from a wide angle end (W) to a telephoto end (T); and the third lens group G3 moves slightly toward the image-forming surface in the optical axis direction to increase an interval between the second lens group G2 and the third lens group G3 at variable power from the wide angle end (W) to the telephoto end (T).

As to the positions of the lens groups at the wide angle end (W), the first lens group G1 and the second lens group G2 are spaced apart from each other, while the second lens group G2 and the third lens group G3 are in close proximity to each other. As to the positions of the lens groups at an intermediate position (M), the second lens group G2 is at or nearly at an intermediate position between the first lens group G1 and the third lens group G3. As to the positions of the lens groups at the telephoto end (T), the second lens G2 comes in close proximity to the first lens group G1, while an interval between the second lens group G2 and the third lens group G3 is increased.

A first lens L1 forming the first lens group G1 and having negative refractive power is a meniscus lens having at least one aspherical surface, and a curvature of a surface R1 facing the object side is larger than the curvature of a surface R2 facing the image-forming surface side.

By forming the first lens L1 in this manner, not only is it possible to correct astigmatism and spherical aberration satisfactorily, but it is also possible to reduce the amount of movement of astigmatism at the time of zooming.

A second lens L2 forming the second lens group G2 and having positive refractive power is a biconvex lens having at least one aspherical surface, and a third lens L3 forming the second lens group G2 and having negative refractive power is a negative meniscus lens having at least one aspherical surface.

By aspherizing the two lenses L2 and L3 forming the second lens group G2 that moves together with the diaphragm, it is possible to correct chromatic aberration satisfactorily by combining the two positive and negative lenses while correcting astigmatism and spherical aberration satisfactorily at the time of zooming.

A fourth lens L4 forming the third lens group G3 and having positive refractive power is a positive meniscus lens in which the curvature of a surface R9 facing the image-forming surface side is larger than the curvature of a surface R8 facing the object side.

By forming the fourth lens L4 in this manner, it is possible to correct aberrations of various kinds satisfactorily.

It is preferable that the miniature zoom lens of the invention satisfies Conditional Expression (1):

$$2.5 < |F_1|/F_W < 3.0 \tag{1}$$

where $F_1$ is a focal length (mm) of the first lens group, and $F_W$ is a focal length (mm) of the overall lens system at the wide angle end.

Conditional Expression (1) above specifies a condition to make the refractive power of the first lens group G1 adequate. When the refractive power of the first lens group G1 becomes too small by exceeding the upper limit, it may be difficult to reduce the overall system in size. When the refractive power of the first lens group becomes too large by exceeding the lower limit, it may be difficult to correct aberrations of various kinds.

Also, it is preferable that the miniature zoom lens of the invention satisfies Conditional Expression (2)

$$1.0 < |F_2|/F_W < 1.5 \qquad (2)$$

where $F_2$ is a focal length (mm) of the second lens group, and $F_W$ is a focal length (mm) of the overall lens system at the wide angle end.

Conditional Expression (2) above specifies a condition to make the refractive power of the second lens group G2 adequate. When the refractive power of the second lens group G2 becomes too small by exceeding the upper limit, the amount of movement of the second lens group G2 is increased, which may make it difficult to reduce the overall system in size. When the refractive power of the second lens group G2 becomes too large by exceeding the lower limit, it may be difficult to correct aberrations of various kinds.

The miniature zoom lens of the invention is of a simple configuration using four lenses in three groups; moreover, it is able to increase a zoom ratio. In addition, because the first lens group is immovable, a total length will not vary at variable power. These configurations enable this zoom lens to be readily incorporated into a mobile phone, a personal digital assistant, a surveillance camera, etc. Further, the first lens group is normally large and heavy. However, in the miniature zoom lens of the invention, the first lens group is immovable and made small, and the light second lens group and the third lens group are moved. This configuration enables actuators used to activate these groups to be reduced in size.

EXAMPLE

The design data in Example 1 is set forth in Table 1 (refer to FIG. 4). In Table 1 are set forth: a radius of curvature, R, (mm), of the surface Ri of each lens; the center thickness of each lens and an air interval between lenses, Di, (mm); a refractive index of an i'th optical material from the object side to the image-forming surface with respect to a line d, Nd; and an Abbe constant Vd in the cross sections of the lenses shown in FIG. 1. Also, k, $A_4$, $A_6$, $A_8$, and $A_{10}$, which are aspheric coefficients in an aspheric expression below, are set forth in Table 2 (refer to FIG. 5). Further, the specification data in this example is set forth in Table 3 (refer to FIG. 6).

[Formula 1]

$$z = \frac{cr^2}{1+\sqrt{1-(1+k)c^2r^2}} + A_4r^4 + A_6r^6 + A_8r^8 + A_{10}r^{10}$$

where z is a coordinate value of a curved surface, r is a distance from the optical axis in a direction intersecting with the optical axis at right angles, c is a curvature at the vertex of the lens, and k, $A_4$, $A_6$, $A_8$, and $A_{10}$ are all aspheric coefficients.

The miniature zoom lens of this example just described satisfies Conditional Expressions (1) and (2) above. The miniature zoom lens of this example is a zoom lens of a simple configuration using four lenses in three groups in which optical surfaces of the four lenses are all aspherized. This zoom lens attains a zoom ratio as high as 2.3 times or more, and is reduced in size with the total length of about 13 mm and the diameter of 4 to 5 mm. Because the first lens group is immovable, the total length will not vary at the time of zooming. Also, as shown in the aberration charts, both the astigmatism and the distortion are well-corrected. This zoom lens, therefore, has a satisfactory optical performance.

Many variations to the above-identified embodiments are possible without departing from the scope and spirit of the invention.

What is claimed is:

1. A miniature zoom lens, comprising, sequentially from an object side toward an image forming side:
   a first lens group having negative refractive power,
   a second lens group having positive refractive power and including a diaphragm, and
   a third lens group having positive refractive power;
   wherein:
     said first lens group comprises a single negative lens;
     said second lens group comprises, sequentially from the object side, a single positive lens and a single negative lens;
     said third lens group comprises a single positive lens;
     said first lens group is immovable;
     said second lens group and said third lens group move in an optical axis direction at variable power;
     the negative lens of said first lens group is a meniscus lens having at least one aspherical surface, and a respective largest curvature surface facing the object side;
     the positive lens of said second lens group includes at least one aspherical surface, and the negative lens of said second lens group includes at least one aspherical surface; and
     the positive lens of said third lens group has a respective largest curvature surface facing the image-forming side.

2. The miniature zoom lens according to claim 1, wherein:
   the positive lens of said second lens group is a biconvex lens;
   the negative lens of said second lens group is a negative meniscus lens; and
   the positive lens of said third lens group is a positive meniscus lens.

3. The miniature zoom lens according to claim 2, wherein the following conditional expression (1) is satisfied:

$$2.5 < |F_1|/F_W < 3.0 \qquad (1)$$

where F1 is a focal length (mm) of the first lens group, and $F_W$ is a focal length (mm) of an overall lens system at a wide angle end.

4. The miniature zoom lens according to claim 2, wherein the following conditional expression (2) is satisfied:

$$1.0 < |F_2|/F_W < 1.5 \qquad (2)$$

where $F_2$ is a focal length (mm) of the second lens group, and $F_W$ is a focal length (mm) of an overall lens system at a wide angle end.

5. The miniature zoom lens according to claim 2, wherein the following conditional expressions (1) and (2) are satisfied:

$$2.5 < |F_1|/F_W < 3.0 \qquad (1)$$

$$1.0 < |F_2|/F_W < 1.5 \qquad (2)$$

where $F_1$ is a focal length (mm) of the first lens group, $F_2$ is a focal length (mm) of the second lens group, and $F_W$ is a focal length (mm) of an overall lens system at a wide angle end.

* * * * *